United States Patent [19]
Yang

[11] Patent Number: 5,214,274
[45] Date of Patent: May 25, 1993

[54] IMAGE SENSOR ARRAY WITH THRESHOLD VOLTAGE DETECTORS AND CHARGED STORAGE CAPACITORS

[75] Inventor: Woodward Yang, Cambridge, Mass.

[73] Assignee: President and Fellows of Harvard College, Cambridge, Mass.

[21] Appl. No.: 919,771

[22] Filed: Jul. 24, 1992

[51] Int. Cl.$^5$ .............................................. H01J 40/14
[52] U.S. Cl. ................................. 250/208.1; 358/228
[58] Field of Search ........ 250/208.1, 214 A, 214 AG, 250/214 C, 214 L, 201.8, 201.1; 307/311, 207; 358/228, 213.19, 213.13, 475, 213.15, 213.11, 213.26

[56] References Cited

U.S. PATENT DOCUMENTS

| | | | |
|---|---|---|---|
| 3,574,443 | 4/1971 | Nanba | 356/215 |
| 3,723,000 | 2/1973 | Sone | 355/83 |
| 3,730,621 | 5/1973 | Sullivan, Jr. | 355/9 |
| 3,903,422 | 9/1975 | Buhrer | 250/461 |
| 3,965,388 | 6/1976 | Brisk | 315/155 |
| 3,990,799 | 11/1976 | Nanba et al. | 356/226 |
| 4,029,966 | 6/1977 | Baker et al. | 250/372 |
| 4,143,968 | 3/1979 | Sader et al. | 355/83 |
| 4,168,124 | 9/1979 | Pizzi | 356/215 |
| 4,203,668 | 5/1980 | Chapman | 356/215 |
| 4,218,139 | 8/1980 | Sheffield | 356/218 |
| 4,227,808 | 10/1980 | Yuasa | 356/218 |
| 4,229,733 | 10/1980 | Tulenko et al. | 340/500 |
| 4,279,254 | 7/1981 | Boschetti et al. | 128/395 |
| 4,350,438 | 9/1982 | Schroter | 355/68 |
| 4,390,258 | 6/1983 | Mizokami | 354/24 |
| 4,498,020 | 2/1985 | Giolma et al. | 307/261 |
| 4,623,927 | 11/1986 | Hoshino | 358/213.19 |
| 4,644,165 | 2/1987 | Ross et al. | 250/372 |
| 4,649,431 | 3/1987 | Terashi | 358/228 |
| 4,820,916 | 4/1989 | Patriquin | 250/227 |
| 4,963,729 | 10/1989 | Spillman et al. | 250/227 |
| 5,025,148 | 6/1991 | Poisel et al. | 250/227 |
| 5,055,668 | 10/1991 | French | 250/208 |

FOREIGN PATENT DOCUMENTS

INPE-203-
RI004 12/1972 Brazil.

OTHER PUBLICATIONS

B. C. Doody and S. G. Chamberlain, "An Improved Wide Dynamic Range Silicon Photodetector for Integration in Image Sensor Arrays", *Can. J. Phys.*, vol. 65, (1987); pp. 919-923.

S. G. Chamberlain and J. P. Y. Lee, "A Novel Wide Dynamic Range Silicon Photodetector and Linear Imaging Array", *IEEE Transactions on Electron Devices*, vol. ED-31 No. 2 (Feb. 1984), pp. 175-182.

Texas Instruments Data Sheet for TSL220, "Light-to-Frequency Converter"; 1991; pp. 1-9.

*Primary Examiner*—David C. Nelms
*Assistant Examiner*—Que T. Le
*Attorney, Agent, or Firm*—Hamilton, Brook, Smith & Reynolds

[57] ABSTRACT

A wide dynamic range sensor employing simple sensing circuitry formed on a single chip provides accurate measurements of an incoming signal capable of varying of a wide dynamic range. Responsive to an incoming signal, the sensor generates output pulses having a frequency which is representative of a property of the incoming signal. By measuring the output pulse frequency, an accurate indication of a property of the incoming signal capable of varying over a range of $10^5$ or more is possible over the entire signal range. A plurality of sensors can be colocated on a single chip for providing a wide dynamic range sensor array.

40 Claims, 3 Drawing Sheets

IMAGE SENSOR ARRAY WITH THRESHOLD VOLTAGE DETECTORS AND CHARGED STORAGE CAPACITORS

BACKGROUND

Various types of sensors are known in the art for measuring physical parameters. Typically, sensors provide a variation in resistance, capacitance or other electrical characteristics as a function of a sensed physical parameter to provide an electrical current or voltage output. For example, photosensors including charge-coupled devices (CCD), photographic films and photodiodes are used for measuring electromagnetic radiation such as light energy. These photosensors can be used individually or can be employed in photosensor arrays for imaging applications.

SUMMARY OF THE INVENTION

Various problems exist with known sensors relating to obtaining accurate sensor measurements of a physical parameter over a wide dynamic range. For example, in a typical image the intensity of light radiation can vary over a dynamic range of four to five orders of magnitude or from about $10^5$ in shadows to about $10^9$ photons/$\mu m^2$ sec in daylight. Existing photosensor arrays (CCDs, photodiodes, photographic film, etc.) employed for detection of such images are limited in their ability to accurately capture the wide dynamic range image information. More specifically, the individual photosensors employed in such arrays are incapable of accurately sensing light varying over a dynamic range of more than two or three orders of magnitude. These photosensors typically require the setting of exposure parameters to optimize the sensitivity of the sensing medium over a limited dynamic range (two or three orders of magnitude) relative to some nominal value of intensity. Image intensity values significantly greater than the nominal intensity value exceed the upper limit of dynamic range and saturate the sensing medium. Similarly, image intensity values significantly smaller than the nominal value fall below the lower limit of dynamic range and are indistinguishable from noise. Thus, capturing the full range of intensity of an image in both shadows and broad daylight would require separate images taken at different exposure parameters.

The limited dynamic range of existing photosensors can be at least partially attributed to their communication of sensor information as analog values of voltage, current or charge. These analog values are typically directed from the sensing medium along external interconnections to a discrete measuring circuit. However, noise on the interconnection limits the dynamic range of the circuit such that accurate measurement of the analog values over a dynamic range of more than two or three orders of magnitude is extremely difficult with most existing sensors.

In accordance with the present invention, a sensor array provides accurate measurement of an incoming signal capable of varying over a wide dynamic range of $10^5$ or more. The array comprises a plurality of sensors colocated on a single integrated circuit (IC) chip. Each sensor generates output pulses, responsive to a portion of the incoming signal, having a frequency which is representative of a property (i.e., magnitude or intensity) of the incoming signal. Frequency of a pulsed signal can be easily and precisely measured and encoded as by simple counter circuitry. By measuring the output frequency of each sensor, an accurate indication of the sensed property of the incoming signal can be obtained across the array over the entire signal range. Thus, for an incoming image having intensity variations of $10^5$ or more, the sensor array can obtain an accurate indication of the image intensity information.

The individual sensors of the array employ simple sensing circuitry which is quite compact and thus suitable for implementation in large arrays. As such, sensor arrays of up to 128×128 sensors in an area of 1.3 cm×1.3 cm can be fabricated using standard 2 micron CMOS technology. Circuit optimization and more advanced VLSI technology can lead to sensing arrays of up to 512×512 sensors.

Each sensor of the sensor array comprises a transducer such as a photodetector which provides an output current responsive to a portion of an incoming signal. Preferably, the incoming signal is in the form of electromagnetic radiation such as light energy, thermal radiation or any other physical parameter. Each sensor also includes a capacitor which receives the transducer output current for charge storage therein. The capacitor is small, having a capacitance of less than about 1 pF, in order to detect even very low current levels from the transducer. In a preferred embodiment, the capacitor comprises the intrinsic capacitance associated with the transducer. Further, an additional capacitive structure or an external capacitor can also be employed within each sensor to provide additional capacitance. In either case, the capacitance associated with each sensor of the array is precisely controlled in the above-noted VLSI fabrication process as compared with fabrication of discrete sensor elements. As such, a high degree of sensing consistency exists across the sensing array such that calibration of individual elements of the array is minimal.

The capacitor integrates the stored charge and generates a corresponding output voltage which is received by a detector. The detector, which can be an inverter or a comparator, compares the received voltage with a threshold voltage. When the received voltage exceeds the threshold voltage, the detector generates an output pulse and a reset signal. In a preferred embodiment, each output pulse also serves as the reset signal. The reset signal is fed back to a device which, in response to the reset signal, discharges the stored charge in the capacitor thereby resetting the capacitor output voltage. As long as each transducer senses an incoming signal, the above-described output pulse generation process repeats such that a series of output pulses are generated by each sensor. The frequency of the output pulses is representative of the magnitude or intensity of that portion of the incoming signal. A plurality of select lines can be employed on the chip for accessing the output pulse streams for each sensor. Further, a plurality of counters can also be employed for determining the output pulse frequency for each sensor. By storing the output pulse frequency for each sensor in a separate memory device, an accurate representation of the image can be reconstructed.

Photosensor arrays incorporating the principles of the present invention can be employed for high quality image encoding/reproduction in spectroscopy, astronomy and imaging application or any other applications in which accurate representation of images varying over a range of about $10^5$ or more is required. Alternatively, these sensors can be used individually in basic analog/control applications as described below.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed on illustrating the principles of the invention.

DETAILED DESCRIPTION OF PREFERRED EMBODIMENTS

Figure 1:
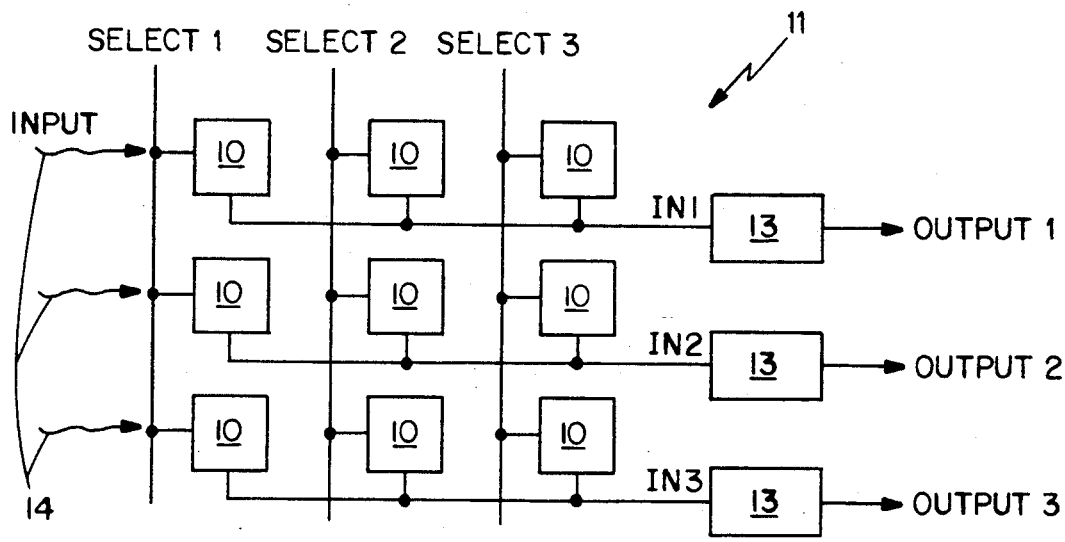
FIG. 1 is a block diagram of a wide dynamic range sensor array of the present invention.

A wide dynamic range sensing array 11 incorporating the principles of the present invention is shown in FIG. 1. The array 11 includes a plurality of sensors 10 colocated on a single IC chip. Each sensor provides a series of output pulses in response to an incoming signal 14 which may vary over a wide range. The incoming signal 14 may be thermal radiation, electromagnetic radiation or a light image which can vary over a range of about $10^5$ or more. For simplicity of description purposes, the incoming signal will hereinafter be described as light radiation.

Each sensor 10 generates an output pulse stream having a frequency which is representative of the intensity of a portion of the light radiation 14 which may vary in intensity over a range of $10^5$ or more. By measuring the frequency of each pulse stream, an accurate indication of the light radiation is obtained over the entire intensity range. Accordingly, a plurality of select lines (SELECT1, etc.) are formed on the IC chip for accessing the output pulse stream generated by each sensor 10. Since each select line is connected to a column of sensors, enabling a select line enables a single column of sensors allowing their pulse streams to be sent in parallel to a column of counters 13 along input lines (IN1, etc). Each counter 13 counts pulses for a period of time or the time between pulses (for low sensed light intensity) for determining a pulse frequency. After each counter has determined pulse frequency for the sensor, the counter outputs are sent along output lines (OUTPUT1, etc.) to a memory device (not shown) for storage or to a digital shift register for serial output.

The sensors 10 of the array 11 employ minimal sensing circuitry which is quite compact and thus suitable for implementation in large sensing arrays. Using standard 2 micron CMOS technology, a 32×32 photosensor array has been fabricated on a single silicon chip of area 4 mm×4 mm which operates on a single 2-10 volt power supply. The photosensor 10 has a 10% fill factor which means that the p-n junction 12 occupies one-tenth of the photosensor area. With a larger silicon area, a 128×128 photosensor array can be fabricated without any technological improvements. Further, circuit optimization and more advanced technology will easily lead to fabrication of 512×512 photosensor arrays.

Figure 2:
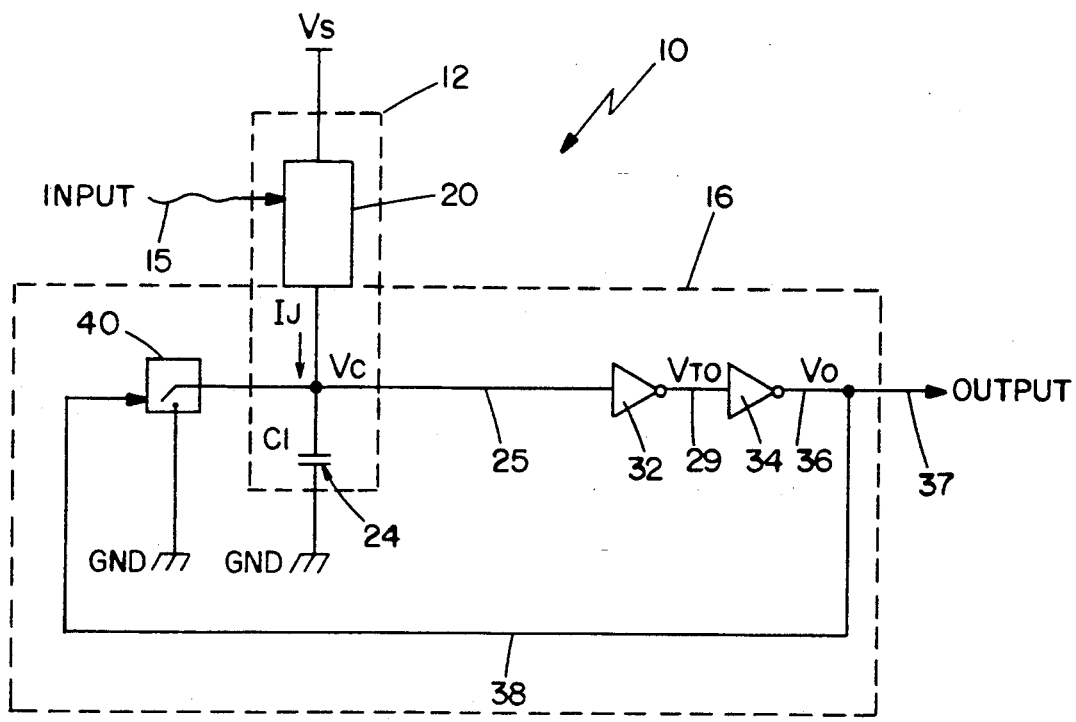
FIG. 2 is a schematic illustration of an individual wide dynamic range sensor of the present invention.

A wide dynamic range sensor 10 incorporating the principles of the present invention is shown in FIG. 2. The sensor 10 employs minimal circuitry such that it may be employed individually on a sensor chip or employed with like sensors on a sensing array chip (described above). In one embodiment, an individual sensor 10 provides accurate indications of the intensity of incoming light radiation 15 capable of varying over a wide intensity range. Incoming light radiation 15 is sensed by a reverse biased p-n junction 20 of a photodiode transducer 12. Responsive to the sensed incoming light, the p-n junction 20 generates a current $I_J$ directly proportional to the light intensity over a wide intensity range. For example, the intensity of light in a typical scene can vary from about $10^5$ in shadows to about $10^9$ photons/$\mu m^2$ sec in daylight, while the amount of photogenerated current responsive to the sensed light in a typical p-n junction varies proportionately from about $1.6\times10^{-14}$ to about $1.6\times10^{-10} A/\mu m^2$.

The photocurrent $I_J$ is an input to the integrate and reset circuit 16 for conversion to a pulse stream. For purposes of illustration, consider the capacitor voltage $V_C$ to be initially LOW. Also consider the sensor output voltage $V_O$ (at 36) to be initially LOW such that the switch 40 is initially OPEN. The photocurrent $I_J$ flows into the capacitor 24 which actually corresponds to the intrinsic capacitance associated with the photodiode 12. The intrinsic capacitance is small, between about 0.01 to 1.0 pF depending on the size of the p-n junction fabrication characteristics and the bias voltage $V_S$. The stored therein, providing an increasing capacitor voltage $V_C$ in accordance with the following equation:

$$V_C = \int_o^t (1/C)I(t)dt \tag{1}$$

The capacitor is an input (at line 25) to an inverter 32 and compared with the inverter threshold voltage. When the capacitor voltage $V_C$ exceeds the inverter threshold voltage, the inverter generates a LOW output signal $V_{TO}$ at line 29. The LOW output signal $V_{TO}$ is inverted by the inverter 34, producing a HIGH sensor output signal V at line 36.

The HIGH sensor output signal $V_O$ serves as a reset signal (at line 38) for the circuit 16. The HIGH $V_O$ is directed via line 38 to the switch 40, closing the switch and shorting the capacitor 24 to ground (GND). While the switch 40 is closed, stored charge discharges from the capacitor 24 such that $V_C$ diminishes to LOW. Further, when the capacitor voltage $V_C$ no longer exceeds the threshold level $V_T$, the inverter output signal $V_{TO}$ switches to LOW. As such, the sensor output signal $V_O$ is in the form of a pulse having a pulse duration which corresponds to the time required to close the switch 40, discharge the capacitor 24, cause the inverter 32 to generate a HIGH output voltage $V_{TO}$ and to invert the HIGH $V_{TO}$ to a LOW $V_{TO}$. After the sensor output signal $V_O$ switches to LOW, the switch 40 opens, completing a single integrate and reset cycle.

Figure 3:
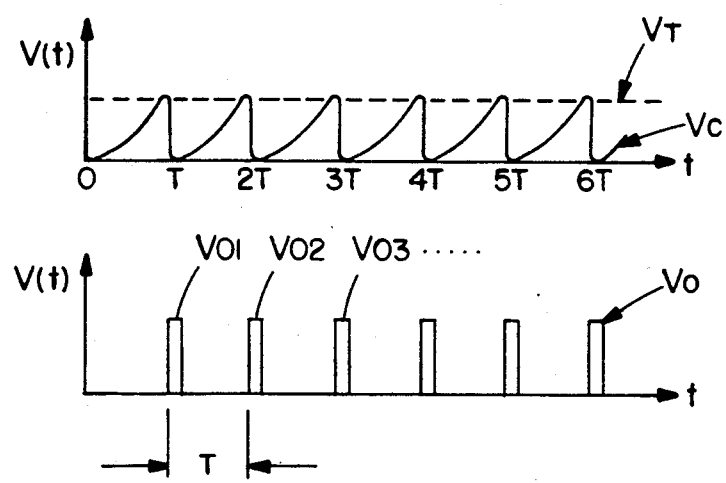
FIG. 3 is a timing diagram illustrating the details of operation of the wide dynamic range sensor of FIG. 2.

Since the p-n junction 20 continuously generates the current $I_J$ in response to sensed light, the circuit 16 performs a plurality of integrate and reset cycles for providing a stream of pulses having a pulse frequency proportional to the intensity of the sensed light. FIG. 3 provides timing diagrams illustrating a sensor output pulse stream for sensed incoming light. Assuming that the capacitor voltage $V_C$ is low at t=0, the capacitor integrates $I_J$ such that $V_C$ increases over time in accordance with equation (1), which can be approximated as below:

$$V_C = (1/C)I\,t\vert_o^t \qquad (2)$$

At some t=T, the capacitor voltage $V_C$ equals the threshold voltage $V_T$ such that equation (2) becomes:

$$V_T = (1/C)I\,T \qquad (3)$$

Immediately thereafter, the capacitor voltage $V_C$ exceeds the inverter threshold voltage ($V_T$) causing a first pulse $V_O$ 1 and thus resetting $V_C$ to LOW. This integrate and reset cycle is repetitive, producing an output pulse ($V_{01}$, $V_{02}$, ... ) every T seconds. By providing a small intrinsic capacitance, the time between output pulses (T) is minimized and the sensitivity of the sensor to low light intensities is maximized. However, the capacitance of the sensor can be increased by introducing an additional capacitive structure or an extense capacitor for increasing the time (T) between output pulses and hence the intensity-to-frequency conversion time.

Figure 4:
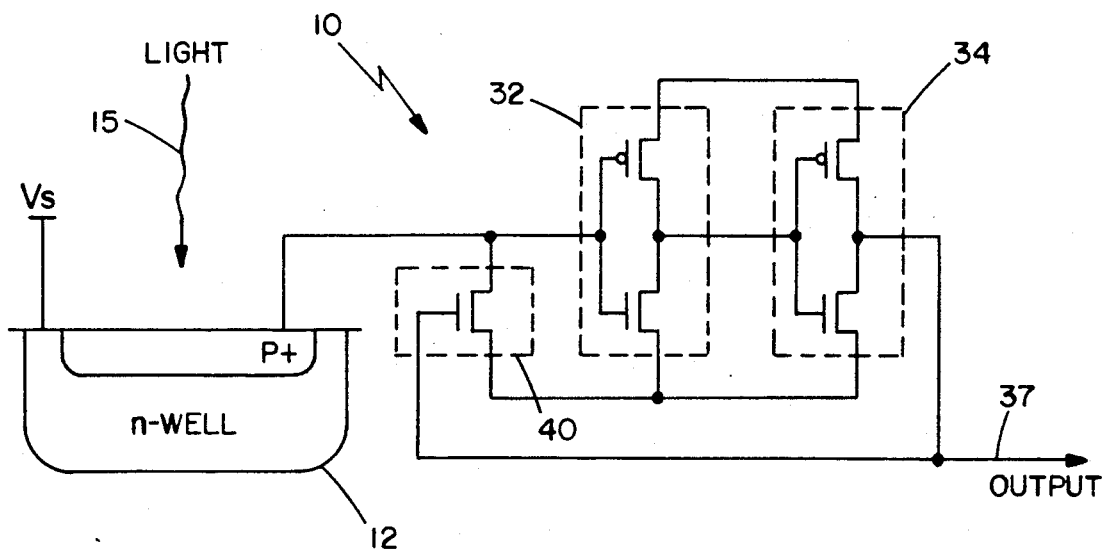
FIG. 4 is a detailed schematic illustration of the sensor circuitry of FIG. 2.

A detailed schematic diagram illustrating the minimum circuitry configuration of an individual photosensor of the present invention is shown in FIG. 4. It is noted that only five transistors are required for an operational photosensor including a single transistor for the switch 40 and two transistors for each inverter 32 and 34. Thus each photosensor requires minimal circuitry and can be fabricated with high fill-factors (amount of area dedicated to image detection). As such, each individual photosensor is quite compact and suitable for implementation in large arrays.

Figure 5:
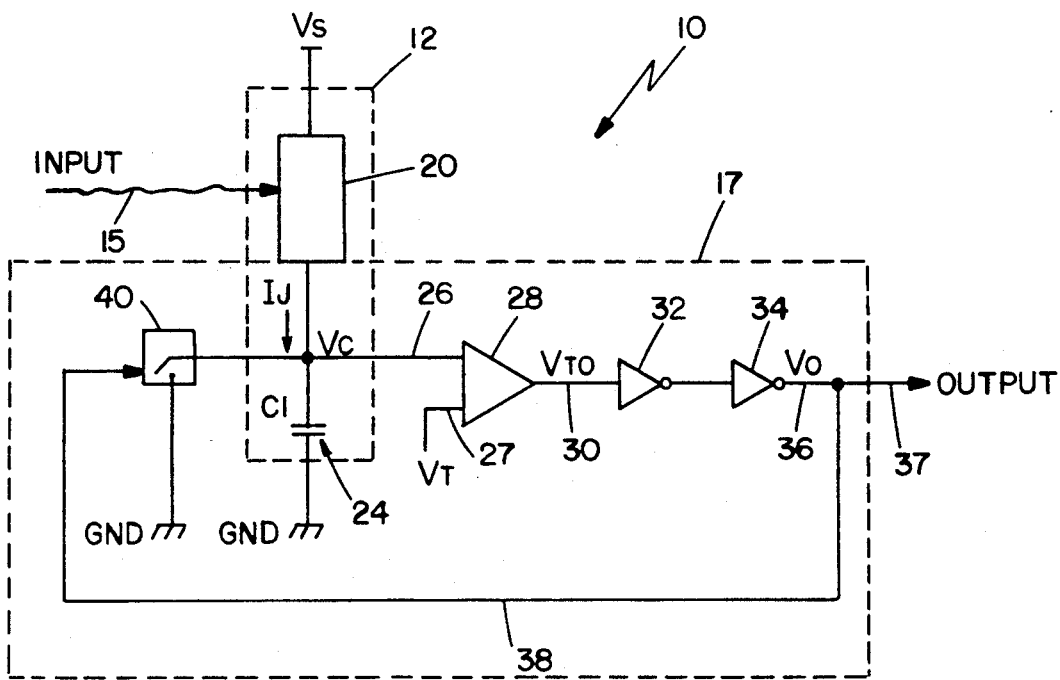
FIG. 5 is a schematic illustration of an alternative embodiment of a wide dynamic range sensor.

Another embodiment of the present invention is shown in FIG. 5. The reversed bias p-n junction 12 of the photodetector 20 generates current $I_J$ proportional to sensed incoming light 15 over a wide intensity range. The photocurrent $I_J$ is an input to an integrate and reset circuit 17. The current $I_J$ flows into the capacitor 24. The capacitor corresponds to the photodiode's intrinsic capacitance and varies between about 0.01 to 1.0 pF. The capacitor 24 integrates $I_J$ as charge is stored in the capacitor providing the capacitor voltage $V_C$ (see equation 1).

The capacitor voltage $V_C$ is an input (at line 26) to a threshold detector 28 and compared with a tunable threshold voltage $V_T$ (at line 27). When the capacitor voltage $V_C$ exceeds the threshold voltage $V_T$, the detector 28 generates a HIGH output signal $V_{TO}$ at line 30. The HIGH output signal $V_{TO}$ is buffered via a pair of inverters 32 and 34, producing a HIGH sensor output signal $V_0$ at line 36. The sensor output signal $V_O$ also serves as a reset signal for the circuitry as explained previously.

Figure 6:
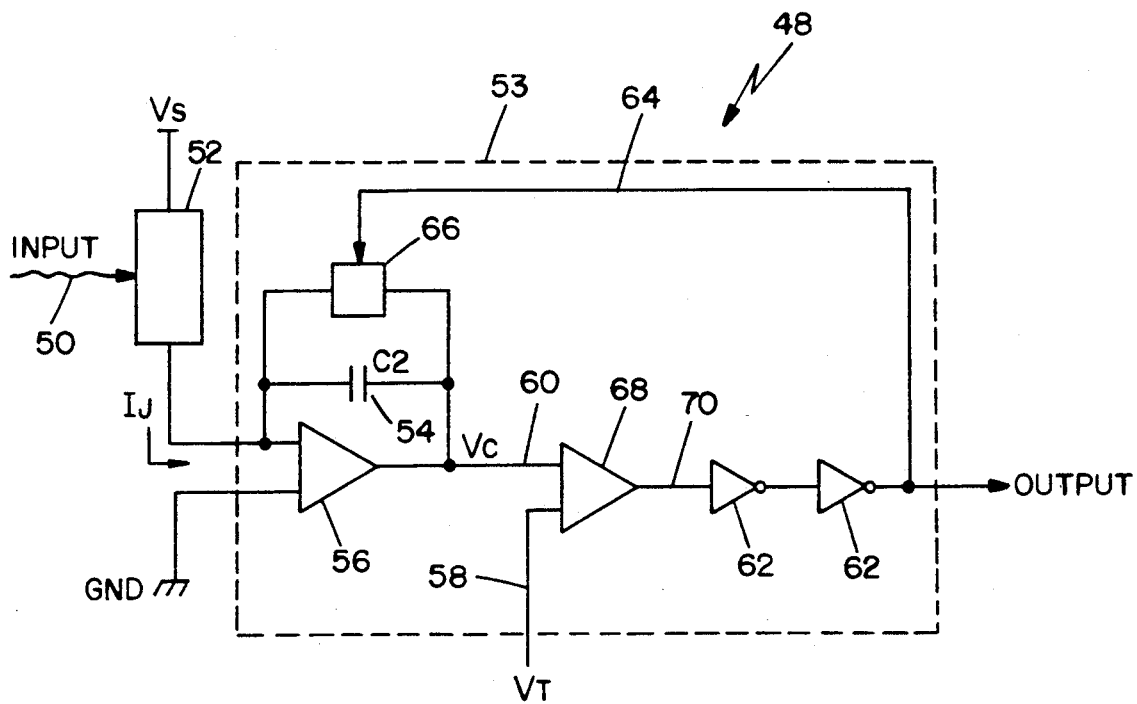
FIG. 6 is a schematic illustration of another alternative embodiment of a wide dynamic range sensor.

Yet another sensor circuit which may be used in the array of the present invention is shown in FIG. 6. This circuit is not preferred, however, because of its added complexity. A sensor 48 comprises a photodetector 52 which generates an output current $I_J$ directly proportional to the intensity of incoming light (at 50). The photocurrent $I_J$ is an input to an integrate and reset circuit 53 for conversion into a pulse stream. More specifically, the current $I_J$ charges a capacitor 54 connected between the negative input and the output of an amplifier 56. The capacitor integrates the current as charge is stored providing a voltage $V_C$ which is an input to the comparator 68. The comparator compares $V_C$ with a tunable voltage $V_T$ (at line 58) and generates a HIGH output signal $V_{TO}$ (at line 70) when $V_C$ exceeds $V_T$. The output $V_{TO}$ is buffered via buffers 62 producing a HIGH sensor output signal at line 64.

The HIGH signal $V_{TO}$ also serves as a reset signal for the circuit. More specifically, $V_{TO}$ is partially buffered and then fed back via line 64 to a switch 66. Responsive to a HIGH $V_{TO}$ signal, the switch 66 closes thus shorting the capacitor 54. As stated in detail previously, this resets the circuit and causes the sensor output at line 64 to be in the form of a pulse for a single integrate and reset cycle. The circuit 53 performs a plurality of integrate and reset cycles for providing a pulse stream having a frequency proportional to the intensity of the incoming light.

Equivalents

While the invention has been particularly shown and described with reference to preferred embodiments art the various changes in form and details may be made without departing from the spirit and scope of the invention as defined by the appended claims.

I claim:

1. A sensor array for measuring intensity of an incoming signal, the array having a plurality of sensors colocated on a single integrated circuit chip, each sensor comprising:
    a transducer for sensing a portion of the incoming signal and for providing an output current related to the sensed incoming signal;
    a capacitor receiving the transducer output current and storing charge associated with the transducer output current, the capacitor integrating current to provide a capacitor output voltage;
    a detector receiving the capacitor output voltage, the detector generating an output pulse when the capacitor output voltage exceeds a threshold voltage and a reset signal for discharging the stored charge in the capacitor, the detector generating a stream of output pulses having a pulse frequency representative of the intensity of said portion of the sensed incoming signal.

2. A sensor array as claimed in claim 1 wherein each transducer is a photodetector comprising a p-n junction.

3. A sensor array as claimed in claim 1 wherein the capacitor has a capacitance of less than about 1 pF.

4. A sensor array as claimed in claim 1 wherein the capacitor comprises an intrinsic capacitance associated with the transducer, the intrinsic capacitance storing substantially all charge associated with the transducer output current.

5. A sensor array as claimed in claim 1 wherein the detector is an inverter.

6. A sensor array as claimed in claim 1 wherein the detector is a comparator having a tunable threshold voltage.

7. A sensor array as claimed in claim 1 wherein each detector output pulse also serves as a reset signal.

8. A sensor array as claimed in claim 1 wherein the incoming signal is capable of varying over a range of $10^5$ or more.

9. A sensor array as claimed in claim 1 wherein each sensor further comprises a switch coupled to the capacitor, the switch being responsive to the reset signal for discharging the stored current in the capacitor.

10. A sensor array as claimed in claim 1 further comprising a series arrangement of buffers connected to the detector output for buffering each output pulse.

11. A photosensor array for measuring intensity of incoming radiation, the array having a plurality of photosensors colocated on a single integrated circuit chip, each photosensor comprising:
  a photodetector for sensing a portion of the incoming radiation and for providing an output current related to the intensity of the sensed incoming radiation;
  a intrinsic capacitor associated with the photodetector, the intrinsic capacitor directly receiving the photodetector output current and storing substantially all charge associated with the photodetector output current, the capacitor integrating current to provide an output voltage;
  a detector receiving the capacitor output voltage, the detector generating an output pulse when the capacitor output voltage exceeds a threshold voltage and a reset signal for discharging the stored charge in the capacitor, the detector generating a stream of output pulses having a pulse frequency representative of the intensity of said portion of the sensed incoming radiation.

12. A photosensor array as claimed in claim 11 wherein the intrinsic capacitor has a capacitance of less than about 1 pF.

13. A photosensor array as claimed in claim 11 wherein the incoming radiation is capable of varying in intensity over a range of $10^5$ or more.

14. A photosensor array as claimed in claim 11 wherein each photosensor further comprises a switch coupled to the capacitor, the switch being responsive to the reset signal for discharging the stored current in the capacitor.

15. A sensor comprising:
  a transducer for providing an output current responsive to an incoming signal;
  a intrinsic capacitor associated with the transducer for storing substantially all charge from the transducer output current, the capacitor integrating current to provide an output voltage;
  a detector receiving the capacitor output voltage, the detector providing an output pulse when the capacitor output voltage exceeds a threshold voltage and a reset signal for discharging the stored current in the capacitor, the detector generating a stream of output pulses having a pulse frequency which is representative of a property of the incoming signal.

16. A sensor as claimed in claim 15 further comprising a switch coupled to the capacitor, the switch being responsive to the reset signal for discharging the current in the capacitor.

17. A sensor as claimed in claim 15 wherein the transducer is a photodetector comprising a p-n junction.

18. A sensor as claimed in claim 15 wherein the intrinsic capacitor has a capacitance of less than about 1 pF.

19. A sensor as claimed in claim 15 wherein the detector is an inverter.

20. A sensor as claimed in claim 15 wherein the detector is a comparator having a tunable threshold voltage.

21. A sensor as claimed in claim 15 wherein each detector output pulse also serves as a reset signal.

22. A sensor as claimed in claim 15 wherein the pulse frequency is proportional to an intensity of the incoming signal.

23. A sensor as claimed in claim 15 further comprising a series arrangement of buffers connected to the detector output for buffering each output pulse.

24. A sensor as claimed in claim 15 wherein the sensor is formed on a single integrated circuit chip.

25. A sensor as claimed in claim 15 wherein the incoming signal is capable of varying over a range of $10^5$ or more.

26. A single-chip photosensor comprising:
  a photodetector for sensing incoming light and for providing an output current related to the sensed light;
  a intrinsic capacitor associated with the photodetector and directly receiving the photodetector output current for storing substantially all charge from the received photodetector output current, the capacitor integrating current to provide an output voltage;
  a detector receiving the capacitor output voltage, the detector generating an output pulse when the capacitor output voltage exceeds a threshold voltage and a reset signal for discharging the stored current in the capacitor, the detector generating a stream of output pulses having a pulse frequency representative of the intensity of the sensed incoming light.

27. A photosensor as claimed in claim 26 further comprising a switch coupled to the capacitor, the switch being responsive to the reset signal for discharging the current in the capacitor.

28. A photosensor as claimed in claim 26 wherein the photodetector comprises a p-n junction.

29. A photosensor as claimed in claim 26 wherein each detector output pulse also serves as a reset signal.

30. A photosensor as claimed in claim 26 wherein the intrinsic capacitor has a capacitance of less than about 1 pF.

31. A photosensor as claimed in claim 26 wherein the incoming light is capable of varying over a range of $10^5$ or more.

32. A method for measuring a property of an incoming signal comprising:
  providing an output current from a transducer being responsive to an incoming signal;
  storing substantially all of the transducer output current in an intrinsic capacitor associated with the transducer, the capacitor integrating the current to provide an output voltage;
  generating an output pulse from a threshold detector receiving the capacitor output voltage when the capacitor output voltage exceeds a threshold voltage and a reset signal from the threshold detector for discharging the stored current in the capacitor, wherein the output pulses form a pulse stream having a frequency being representative of a property of the incoming signal.

33. A method as claimed in claim 32 further comprising providing a switch coupled to the capacitor, the switch being responsive to the reset signal for discharging the stored current in the capacitor.

34. A method as claimed in claim 32 wherein the transducer comprises a photodetector.

35. A method as claimed in claim 32 wherein the intrinsic capacitor has a capacitance of up to about 1 pF.

36. A method as claimed in claim 32 wherein the frequency of the output pulses is proportional to an intensity of the input signal.

37. A method as claimed in claim 32 wherein the transducer, capacitor and detector are colocated on a single integrated circuit chip.

38. A method for measuring intensity of incoming light comprising:

sensing the incoming light with a photodetector which provides an output current responsive to the sensed light;

storing substantially all of the output current on an intrinsic capacitor associated with the photodetector and directly receiving the output current, the capacitor integrating the current for providing an capacitor output voltage;

generating an output pulse from a detector which receives the capacitor output voltage when the capacitor output voltage exceeds a threshold voltage of the detector and generating a reset signal for discharging the stored current in the capacitor, wherein the output pulses form a pulse stream having a frequency which is representative of the intensity of the sensed incoming light.

39. A method as claimed in claim 38 further comprising providing a switch coupled to the capacitor, the switch being responsive to the reset signal for discharging the stored current in the capacitor.

40. A method as claimed in claim 38 wherein the incoming light is capable of varying in intensity over a range of $10^5$ or more.

* * * * *